Miller, Clemens & Clemens.
Excavator.
Nº 25,703.  Patented Oct. 4, 1859.
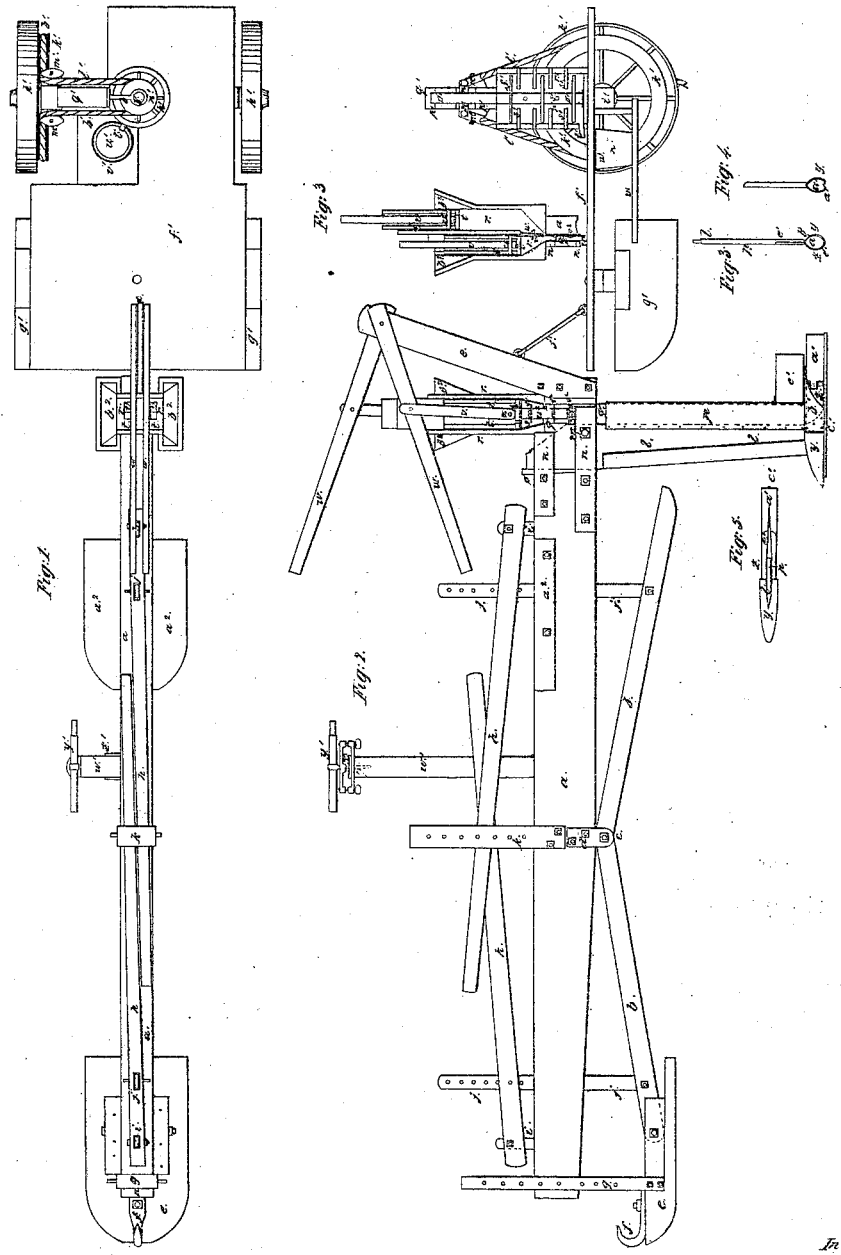

UNITED STATES PATENT OFFICE.

JAMES C. MILLER, OF UNION TOWNSHIP, (IRWIN P. O.,) UNION COUNTY, OHIO, STILLMAN A. CLEMENS, OF ROCKFORD, ILLINOIS, AND GILBERT H. CLEMENS, OF URBANA, OHIO.

IMPROVEMENT IN LINING UNDERGROUND DRAINS.

Specification forming part of Letters Patent No. 25,703, dated October 4, 1859.

*To all whom it may concern:*

Be it known that we, JAMES C. MILLER, of Union township, (Irwin P. O.,) in the county of Union and State of Ohio, and STILLMAN A. CLEMENS, of Rockford city, in the county of Winnebago and State of Illinois, and GILBERT H. CLEMENS, of the town of Urbana, in the county of Champaign and State of Ohio, have jointly invented a new and useful Improvement on Machines for Making Covered Field-Drains; and we do hereby declare that the following is a full and exact description thereof, reference being had to the accompanying drawings, of which—

Figure 1 is a plan, and Fig. 2 an elevation, partly in section, of the entire machine; and Fig. 3, an elevation, partly sectional, and Fig. 4 an elevation, and Fig. 5 a plan, of parts of the machine, the same letters referring to like parts in all the figures.

Our invention consists in lining the inner surface of a tubular opening made in the subsoil by a draining-mole with a coat of either hydraulic or common lime mortar, which is conveyed down to the rear of a draining-mole through a conducting-tube which is supported back of a colter, to the lower end of which the mole is attached, the mortar being forced downward through the conducting-tube from a plunger-box or mortar-hopper above by means of a forcing-bar with attached valvular pistons, which works within and through the entire length of the conducting-tube, and which is worked up and down by suitable connections for this purpose at its upper end, and may act in connection with a plunger in the box above; also, to the rear end of the draining-mole is fastened a follower, which is shaped in its transverse section like that of the mole, but is of less area in the section, and by which the thickness of the coating of mortar and the shape of the finished drain on the inside are determined; and, also, on the lower side of the mole and follower a groove is made or narrow tongue attached, by which an opening is left through the mortar lining of the drain for the access of water from the adjacent earth.

In the accompanying drawings, $a$ is a beam, to which the other parts of the machine are attached.

$b\ b$ are skids, hinged to the beam by a bolt, $c$, which passes through the ear-plates $d$, made fast on the sides of the beam.

$e$ is a shoe, to which the forward skid is attached by a bolt, which allows a hinge movement.

$f$ is a drawing-hook fastened to the shoe.

$g\ g$ are steadying-posts on each side of the beam, which are fastened to the shoe below and have pin-holes for the adjustable application of a supporting-pin under the beam at any desired height. The right-hand or rear skid rests its free end on the ground.

$h\ h$ are levers used for raising either end of the beam, to which they are attached by fulcrum-bolts passing through posts $i\ i$.

$j\ j$ are posts hinge-fastened to the skids below and passing upward through free mortises in the beam, and levers $h\ h$ have holes for adjustable supporting-pins, upon which the levers rest.

$k$ is a pin-post fastened on each side of the beam, through the holes in which pins are passed over the levers, retaining each at any height.

$l$ is a broad and thin colter, fastened to the beam by a bolt, $m$, side bars, $n\ n$, and key $o$.

$p$ is a sheet-metal conductor-case, the forward edges of which are riveted on each side of the back part of the colter.

$q$ is a flat conducting-tube, made of sheet metal, which lies within the case, and, extending downward the length of the colter, with both its ends open, it above connects with the funnel-shaped bottom of a plunger-box or mortar-hopper, $r$, or with two plunger-boxes, $r\ r$, with either of which it alternately may communicate through the adjustable vibration of a hinged valve, $s$.

$t\ t$ are single-acting plungers or pistons, with small vacuum supply-valves on their faces below, and by pins $u\ u$ and rods $v\ v$ they are connected above to the levers $w\ w$, which have their common fulcrum-pin in the upper end of a post, $x$, the foot of which is fastened to the rear end of the beam. The upper part of the conducting-tube and also the plungers and plunger-boxes are shown in section in Figs. 1 and 3.

$u^2$ is a forcing-bar made of plate-iron and fastened by the pin $u$ to the connecting-rod $v$, and by this to the lever $w$, which is directly above it.

Upon one side of $u^2$ (or, at choice, upon both sides) are fastened hinged valve-pistons $v^2$ $v^2$ $v^2$, which are so made and attached as to open out from the forcing-bar against any resisting substance within the conductor when the bar is depressed, and close down parallel with it when the bar is raised. The upper valve-pistons on the forcing-bar are shown in the drawings as opened out, and the lower one is closed. The bar $u^2$ lies within the conducting-tube, and is of such length that when depressed it extends the entire length of the latter, and it has a valve-piston like $v^2$ at its lower end and others at short distances for its whole length. It may be used in connection with either or both plungers $t$ $t$; but in the latter case the swinging valve $s$ is removed, or the forcing-bar, with its appendages, may alone be used with a single mortar-hopper.

To the lower end of the colter is fastened a draining-mole, $y$, which, enlarging from its point, has its largest transverse sectional area opposite the back edge of the colter, and is then abruptly diminished in size on its periphery, as shown at $z$, and extending back it supports a follower, $a'$, by a hinge-joint, which allows only lateral movement in the latter.

$b'$ is a sheet-metal mortar-shield, which clasps both sides of the conductor-case and colter, and being fastened to the largest swell of the mole it has the same outline in the transverse section, and extending back it tapers to a point over the follower, forming a covered way over the top and sides of the rear part of the mole, which communicates with the interior of the conducting-tube through the open bottom of the latter.

$c'$ is a narrow and shallow rib, which is wedge-shaped in front and is attached in two pieces, one to the mole on its bottom and the other in the same line to the follower.

$d'$, Fig. 4, is a groove made longitudinally in the bottom of the mole through its whole length and continued less deep in the follower, and is in some cases used as a substitute for the rib $c'$ and for the like purpose.

$e'$ is a wedge-shaped attachment to the back side of the lower end of the conductor-case and tapers to an edge at the rear, having at its junction with the case the same thickness as the latter.

$f'$ is a platform-drag resting forward upon sled-runners $g'$ $g'$ and behind upon the road-wheels $h'$ $h'$ and their attached axle $i'$.

$j$ is a hook-link by which the drag is hitched to the beam.

$k'$ is a grooved pulley fastened to one of the road-wheels, and carries a band, $l'$, which, directed by guide-pulleys $m'$ $m'$, passes around a small pulley, $n'$, which is fast on a vertical shaft, $o'$, which is supported by journal-boxes $p'$ $p'$, which are bolted to a post, $q'$, which at its foot is fastened to the axle $i'$.

In the section $r'$ is a tub, on the bottom of which rests the foot of shaft $o'$, and $s'$ $s'$ are pins, some of which are fastened to the shaft and others to the sides of the tub, and all projecting into the tub horizontally in such manner that they will not collide when the shaft is revolved.

$t'$ is a spout leading from the bottom of the tub and into a movable vessel, $u'$, on a shelf, $v'$, which is supported below an opening in the platform.

$w'$ is a post supported perpendicular to the beam, and upon its upper end, which inclines outward, is placed a spirit-level, $x'$, and a field-telescope, $y'$, provided with means of adjustment in a range of several degrees inclination with the horizon.

$z'$ is a socket supporting the foot of the post, and from which it is removable at pleasure.

$a^2$ $a^2$ are planks bolted to the beam, which form a stand for the workman who operates the levers $w$ $w$, and, together with the shoe $e$, they are rounded on their forward part, that the beam may be turned down and drawn from place to place.

$b^2$ $b^2$ are funnel-shaped mouths of the mortar-hoppers $r$ $r$.

In operating our invention a hole is first dug at the place where the drain is to be begun and of the desired depth, into which the mole, with its connected parts, is lowered. The inclination of the bottom of the drain is then determined by surveying the ground on the proposed route with the field-telescope, and then adjusting the instrument so that its visual axis shall correspond with the dip or rise which the feature of the ground makes necessary. The colter having been fastened to the beam in such a position that the bottom of the mole is parallel with the top of the beam, the latter is now adjusted at a corresponding angular inclination with that of the telescope, and the same movement also gives the proper inclination or bend to the mole and follower. Then by viewing through the telescope or any equivalent field-viewing instrument any suitable fixed object, either before or behind, as may be most convenient, and so operating the leveling-levers $h$ $h$ that the object is kept in view in line with the visual axis of the instrument during the progress of the work, the advance of the machine will make a drain of true inclination without regard to small inequalities on the surface of the ground. A spirit-level placed upon the top side of the beam is a convenient aid in operating the machine in addition to the instruments described.

As material for lining the inside of the drain made by our machine, we have used both hydraulic lime and common lime mortar, and contemplate the use of mineral tar mixed and used hot with sand, or of any other suitable substances that can be prepared for use in a plastic or semi-fluid state and will harden, to give permanence to the drain within which they are applied.

Any sufficient motive power for drawing the machine is attached by the drawing-hooks $f$ In some cases the draft is attached to the end of the beam forward, or to a draft-rod made fast to the colter near its junction with the lower side of the beam. The ingredients of the mortar are put into the tub $r'$, and when the machine advances the rotation of the road-wheel, to which the grooved band-wheel is attached, causes a revolution of the shaft and its attached pins in the tub, and these, in connection with the stationary pins projecting from the sides of the tub, mix the materials, and the mortar escapes through the spout into the bucket below. In preparing to make a drain, or in starting after a stoppage, the mortar is otherwise mixed until the advance of the machine does the mixing in the tub. When the plunger $t$ is raised the mortar poured from the bucket into the hopper $b^2$ falls down into the plunger-box. A workman upon the stand $a^2$ operates either or both the plunger-levers and their attached plungers. When both are used he alternately raises one lever with a quick movement and at the same time slowly depresses the other. This depression of either plunger, by pressing the mortar below, causes the hinged valves to swing to the other side, closing the communication with the box, from which pressure is withdrawn, and opening it from below the working plunger into the conducting-tube. Through the conducting-tube the mortar passes downward under the shield $b'$, from which it issues backward, filling the space between the follower $a'$ and the earth walls of the drain on all sides. The pressure upon the mortar from above and the adhesion to the earth below cause the follower to draw through the mortar and leave a continuous lining of the same on the inside of the drain.

The tongue $c'$, fastened on the bottom of the mole and follower, projects downward barely sufficient to prevent the mortar from passing entirely around the bottom of the follower and preserves a narrow strip of earth uncoated with mortar at the bottom of the drain, through which the external water in the adjacent subsoil may find access into the cavity of the drain. The longitudinal groove $d'$, made the entire length on the bottom of the mole, and in some cases continued on the follower in the progress of the mole through the earth, causes the formation of a slight ridge of earth, which projects upward against the bottom of the follower, and also prevents the junction of the mortar and affords admission to the water, and is generally better than the rib $c'$. The wedge $e'$ serves to prevent the waste of mortar by its escape upward behind the conductor-case before the closing of the slit in the earth made by the passage of the colter through it. We omit $c'$ and $d'$ to make aqueduct-pipe.

The action of the forcing-bar $u^2$, with its attached valve-pistons $v^2$ $v^2$, is found to be more favorable than that of the plungers when mortar of thick consistency is used, the valve pistons at their downward stroke moving the mortar in all the length of the conducting-tube and effectually preventing all stoppage by the packing of the sand or gravel in the mortar. With mortar of thin consistency (which is only suitable in forming a thin coating on the inside of the drain) either one or both of the plungers may be used, and either with or without connection with the forcing-bar; and mortar sufficiently fluid to form a very thin coating will descend the conductor and envelop the follower by hydrostatic pressure alone; but as our recent practice shows the forcing-bar alone, with its valvular pistons, is best adapted for all kinds of mortar, we have therefore shown it in connection with only one plunger in our accompanying model. We have also ascertained that unless the subsoil in which the drain is made is very soft the use of the mortar-shield $b'$ may be dispensed with, and therefore it is not shown in the model nor in Fig. 5. In some cases we make an inflexible attachment of the follower to the mole, and it may be of the same piece with the latter.

The case $p$ may form a part of the conducting-tube by extension upward by means of a removable section of tube. We make the transverse section outline of the mole circular and elliptic, both top and bottom, and also flat on the bottom, and sometimes only apply mortar to line the arch above. For soft peaty subsoils we make a cylindrical mole tapering to a point in line with its axis. In solid subsoils the point should be in line with the bottom of the mole.

The colter and appendages may be attached to any other form of beam and its operating attachments.

The drag, though convenient, may be dispensed with and the mortar otherwise mixed. It is therefore not made a part of our model. We also contemplate giving reciprocating motion to the forcing-bar by a crank at its upper end, to which it is to be connected, and which receives motion by gearing from a ground-wheel attached, similar to $h'$.

As in varied practice parts of our invention may be used beneficially, while others are dispensed with, we do not therefore wish to be limited to the use of all the parts in connection. Disclaiming all save as follows,

What we claim, and wish to secure by Letters Patent, is—

1. The method of making covered field-drains by lining the inside with hydraulic lime, mortar, or other suitable material.

2. A conducting-tube connected with a colter.

3. A forcing-bar with valve-pistons attached and working in a conducting-tube.

4. A follower of less transverse dimensions than the mole to which it is attached, all substantially as described, and for the specified purposes.

JAMES C. MILLER.
STILLMAN A. CLEMENS.
GILBERT H. CLEMENS.

Witnesses:
HERVEY EVANS,
HARRISON MILLER.